(12) United States Patent
Cao

(10) Patent No.: US 10,877,323 B2
(45) Date of Patent: Dec. 29, 2020

(54) PIXEL ELECTRODE

(71) Applicant: Shenzhen China Star Optoelectronics Semiconductor Display Technology Co., Ltd., Shenzhen (CN)

(72) Inventor: Wu Cao, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/493,305

(22) PCT Filed: May 13, 2019

(86) PCT No.: PCT/CN2019/086660
§ 371 (c)(1),
(2) Date: Sep. 12, 2019

(87) PCT Pub. No.: WO2020/164200
PCT Pub. Date: Aug. 20, 2020

(65) Prior Publication Data
US 2020/0257174 A1    Aug. 13, 2020

(30) Foreign Application Priority Data

Feb. 12, 2019 (CN) .......................... 2019 1 0111193

(51) Int. Cl.
*G02F 1/1343*   (2006.01)
(52) U.S. Cl.
CPC .. *G02F 1/134309* (2013.01); *G02F 1/134336* (2013.01); *G02F 2001/134318* (2013.01); *G02F 2001/134345* (2013.01)

(58) Field of Classification Search
CPC ... G02F 1/134336; G02F 2001/134318; G02F 2001/134345; G02F 1/1343; G02F 1/134309; G02F 1/13439; G02F 1/136286; G02F 1/155; G02F 1/1393; G02F 1/1395; G02F 1/136; G02F 1/218;
(Continued)

(56) References Cited

U.S. PATENT DOCUMENTS

2003/0086044 A1* 5/2003 Inoue ................ G02F 1/134363
349/141
2006/0146243 A1* 7/2006 Nakanishi ......... G02F 1/133711
349/139
(Continued)

FOREIGN PATENT DOCUMENTS

CN      102236219      11/2011
CN      102269898      12/2011
(Continued)

*Primary Examiner* — Shan Liu

(57) ABSTRACT

A pixel electrode includes a first pixel electrode and a plurality of second pixel electrodes. Each of the second pixel electrodes includes a first sub-branch and a second sub-branch, one end of the second sub-branch is connected to the first pixel electrode, and the opposite end is connected to the first sub-branch. The first width of the first sub-branch is different from the second width of the second sub-branch. By changing a width of a branch at a junction with a trunk portion, it is possible to effectively control black stripes, thereby improving liquid crystal efficiency and a transmittance of a liquid crystal display panel.

8 Claims, 11 Drawing Sheets

(58) Field of Classification Search
CPC ......... G02F 1/134363; G02F 1/134327; G02F
1/133707; G02F 1/0316; G02F
2001/134372; G02F 2001/134381; G02F
2001/1357; G02F 2001/136218; G02F
2001/136295; G02F 2001/1552; G02F
2001/1555; G02F 2001/1557; G02F
2001/13629; G02F 2201/12; G02F
2201/121; G02F 2201/124; G02F
2201/122; G02F 2201/123; G02F
2201/14; G02F 2202/10; G02F 1/1362;
G02F 1/136209; G02F 1/136227; G02F
1/1365; G02F 1/1368; G02F
2001/136222; G02F 2001/136231; G02F
2001/13625; G02F 2001/1635; H01L
27/124; H01L 27/3276; H01L 27/3297;
H01L 27/3279; H01L 27/329; H01L
23/49534; H01L 2933/0016; H01L
2021/775; H01L 27/1214; H01L 27/2436;
H01L 29/66037; H01L 29/66068; H01L
29/66227; H01L 29/72; H01L 29/786;
H01L 2924/1304; H01L 51/0504; H01L
51/0508; G09G 2300/0421; G09G
2300/0426; G09G 2300/0439; G09G
3/3659

USPC .................................................. 349/139–148
See application file for complete search history.

(56) References Cited

U.S. PATENT DOCUMENTS

| 2013/0003007 A1* | 1/2013 | Zhang ............... G02F 1/134309 349/142 |
| 2013/0021570 A1* | 1/2013 | Zhang ............... G02F 1/134336 349/139 |
| 2013/0194536 A1* | 8/2013 | Tae, II ............. G02F 1/134309 349/143 |
| 2014/0098317 A1* | 4/2014 | Jung ................. G02F 1/134336 349/43 |
| 2015/0163968 A1* | 6/2015 | Lee ................... G02F 1/133711 427/532 |
| 2017/0205670 A1 | 7/2017 | Hirata |
| 2018/0335675 A1 | 11/2018 | Ye |

FOREIGN PATENT DOCUMENTS

| CN | 105589263 | 5/2016 |
| CN | 106094368 | 11/2016 |

* cited by examiner

US 10,877,323 B2

PIXEL ELECTRODE

RELATED APPLICATIONS

This application is a National Phase of PCT Patent Application No. PCT/CN2019/086660 having International filing date of May 13, 2019, which claims the benefit of priority of Chinese Patent Application No. 201910111193.0 filed on Feb. 12, 2019. The contents of the above applications are all incorporated by reference as if fully set forth herein in their entirety.

FIELD AND BACKGROUND OF THE INVENTION

The present disclosure relates to the field of display technologies, and in particular, to a pixel electrode.

A transmittance of a liquid crystal display panel is mainly affected by three physical factors, including a total absorption transmittance of a transmission film layer, an absolute aperture ratio, and liquid crystal efficiency. When product technologies are advanced, how to increase the liquid crystal efficiency by using a pixel electrode pattern design is an important way to improve the transmittance without changing the absorption of the film layer and a size of an opening area. Generally, a pixel electrode includes a trunk portion and a branch structure. As shown in FIG. 1, the pixel electrode includes the trunk portion including a central trunk portion 11 having a cross shape and side trunk portions 13 located at a periphery of the central trunk portion 11 and pixel electrode branches 12. When the pixel electrode is energized, it can generate a tilted electric field, thereby inducing liquid crystal molecules in different regions to be inclined in different directions.

As shown in FIG. 2, which is an enlarged schematic view showing a partial structure of a central trunk portion 11 (or a side trunk portion 13) and pixel electrode branches 12 in the prior art. A pattern width of one of the pixel electrode branch 12 is L, and a gap between two adjacent pixel electrode branches 12 is S, and the sum of the two is P. In general, the smaller the P value, the better the transmittance of the display panel. When the P value reaches a critical process limit, the effect of increasing the transmittance is not obvious. A ratio of L to S is very delicate. Theoretically, the larger the L value, the stronger the vertical electric field generated, and the more obvious the improvement of the inclination angle, the higher the transmittance. However, from simulation results, since a boundary between the trunk portion and the pixel electrode branch 12 is affected by the complex electric field, the boundary does not follow this rule. In the boundary region between the trunk portion and the pixel electrode branch 12, black stripes are easily deteriorated, which affects the transmittance.

SUMMARY OF THE INVENTION

The present disclosure provides a pixel electrode to solve problems that in an existing pixel electrode, since a boundary of a trunk portion and branches is affected by a complex electric field, black stripes are deteriorated, which affects the liquid crystal efficiency, thereby affecting a transmittance of a liquid crystal display panel.

In order to solve the above problems, the technical solutions provided by the present disclosure are as follows.

The present disclosure provides a pixel electrode a pixel electrode, comprising: a first pixel electrode and a plurality of second pixel electrodes, where each of the second pixel electrodes comprises: a first sub-branch and at least one second sub-branch. The first sub-branch includes a first side and the second sub-branch includes a second side, where one end of the second sub-branch is connected to the first sub-branch, and another end is connected to the first pixel electrode; where a first width of the first sub-branch is different from a second width of the second sub-branch; the second sub-branch comprises an axisymmetric pattern or a center symmetric pattern; and the first pixel electrode divides a sub-pixel area into a plurality of domains, and the plurality of second pixel electrodes are spaced and arranged in parallel, and one of the second pixel electrodes is located in one of the domains.

In at least one embodiment of the present disclosure, the first width of the first sub-branch is less than the second width of the second sub-branch.

In at least one embodiment of the present disclosure, the second sub-branch comprises an isosceles trapezoid, and a width of the second sub-branch is gradually increased along a direction of a symmetry axis of the second sub-branch toward the first pixel electrode.

In at least one embodiment of the present disclosure, the second sub-branch comprises a parallelogram, and the second side of the second sub-branch overlaps with a line where the first side of the first sub-branch is located.

In at least one embodiment of the present disclosure, the first width of the first sub-branch is greater than the second width of the second sub-branch.

In at least one embodiment of the present disclosure, the second sub-branch comprises an isosceles trapezoid, and a width of the second sub-branch is gradually decreased along a direction of a symmetry axis of the second sub-branch toward the first pixel electrode.

In at least one embodiment of the present disclosure, the second sub-branch comprises a parallelogram, and the second side of the second sub-branch is parallel to the first side of the first sub-branch.

In at least one embodiment of the present disclosure, a vertical distance between two first sides of two adjacent first sub-branches in one domain ranges from 6 to 4.5 micrometers.

The present also disclosure provides another pixel electrode, comprising: a first pixel electrode and a plurality of second pixel electrodes, where each of the second pixel electrodes comprises: a first sub-branch and at least one second sub-branch. The first sub-branch includes a first side and the second sub-branch includes a second side, where one end of the second sub-branch is connected to the first sub-branch, and another end is connected to the first pixel electrode; where a first width of the first sub-branch is different from a second width of the second sub-branch.

In at least one embodiment of the present disclosure, the second sub-branch comprises an axisymmetric pattern or a center symmetric pattern In at least one embodiment of the present disclosure, the first width of the first sub-branch is less than the second width of the second sub-branch.

In at least one embodiment of the present disclosure, the second sub-branch comprises an isosceles trapezoid, and a width of the second sub-branch is gradually increased along a direction of a symmetry axis of the second sub-branch toward the first pixel electrode.

In at least one embodiment of the present disclosure, the second sub-branch comprises a parallelogram, and the second side of the second sub-branch overlaps with a line where the first side of the first sub-branch is located.

In at least one embodiment of the present disclosure, the first width of the first sub-branch is greater than the second width of the second sub-branch.

In at least one embodiment of the present disclosure, the second sub-branch comprises an isosceles trapezoid, and a width of the second sub-branch is gradually decreased along a direction of a symmetry axis of the second sub-branch toward the first pixel electrode.

In at least one embodiment of the present disclosure, the second sub-branch comprises a parallelogram, and the second side of the second sub-branch is parallel to the first side of the first sub-branch.

In at least one embodiment of the present disclosure, the first pixel electrode divides a sub-pixel area into a plurality of domains, and the plurality of second pixel electrodes are spaced and arranged in parallel, and one of the second pixel electrodes is located in one of the domains.

In at least one embodiment of the present disclosure, in one domain, a horizontal distance between two second sides of two adjacent second sub-branches is equal to another horizontal distance between two first sides of two adjacent first sub-branches.

In at least one embodiment of the present disclosure, a vertical distance between two first sides of two adjacent first sub-branches in one domain ranges from 6 to 4.5 micrometers.

In at least one embodiment of the present disclosure, the first pixel electrode includes a central trunk portion and side trunk portions, the central trunk portion is in a cross shape, and the side trunk portions are disposed on two opposite sides of the central trunk portion.

The beneficial effects of the present disclosure are as follows: by setting a first sub-branch at a boundary between a trunk portion and a branch portion of a pixel electrode to change a width of the branch portion at the boundary, black stripes can be effectively controlled, thereby increasing the liquid crystal efficiency and the transmittance of the liquid crystal display panel.

BRIEF DESCRIPTION OF THE SEVERAL VIEWS OF THE DRAWINGS

In order to more clearly illustrate the embodiments or the technical solutions in the prior art, the drawings to be used in the embodiments or the prior art description will be briefly described below. Obviously, the drawings in the following description are only some embodiments of the disclosure, and those skilled in the art can obtain other drawings according to the drawings without creative efforts.

DESCRIPTION OF SPECIFIC EMBODIMENTS OF THE INVENTION

Figure 1:
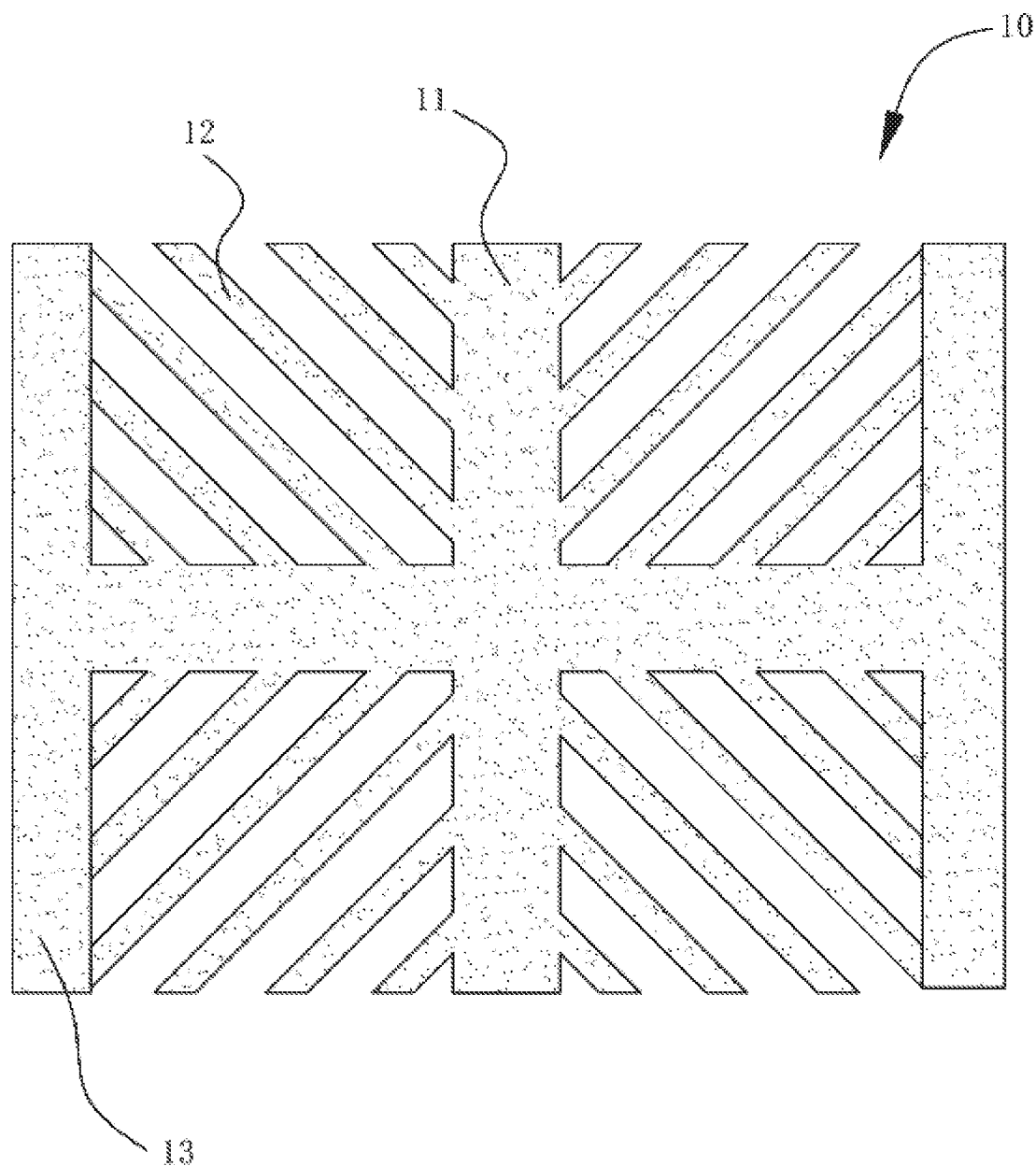
FIG. 1 and FIG. 2 are schematic diagrams of a pixel electrode of the prior art.
Figure 2:
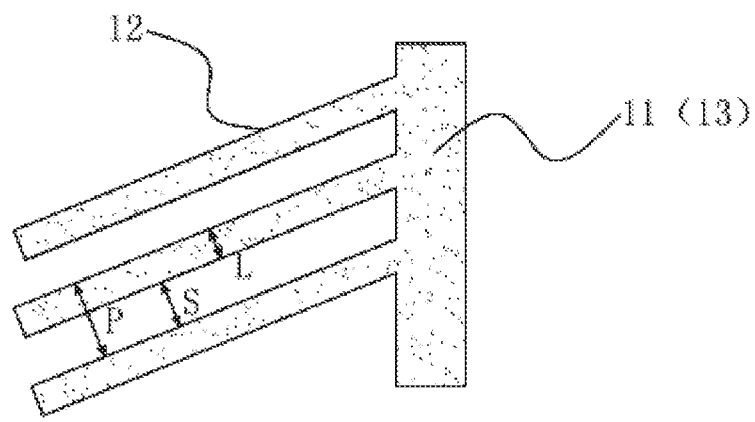

In the following detailed description of the preferred embodiments, reference is made to the accompanying drawings which form a part hereof, and in which is shown by way of illustration specific embodiments in which the disclosure may be practiced. In this regard, directional terminology, such as "top", "bottom", "front", "back", "left", "right", "inside", "outside", "side", etc., is used with reference to the orientation of the pattern(s) being described. As such, the directional terminology is used for purposes of illustration and is in no way limiting. Throughout this specification and in the drawings like parts will be referred to by the same reference numerals.

The present disclosure is directed to a conventional pixel electrode, which is capable of deteriorating black stripes due to an influence of a complex electric field at a boundary of a trunk portion and a branch of the pixel electrode, which affects liquid crystal efficiency, thereby affecting a transmittance of a liquid crystal display panel. The embodiments of the present disclosure can solve these disadvantages.

First Embodiment

Figure 3:
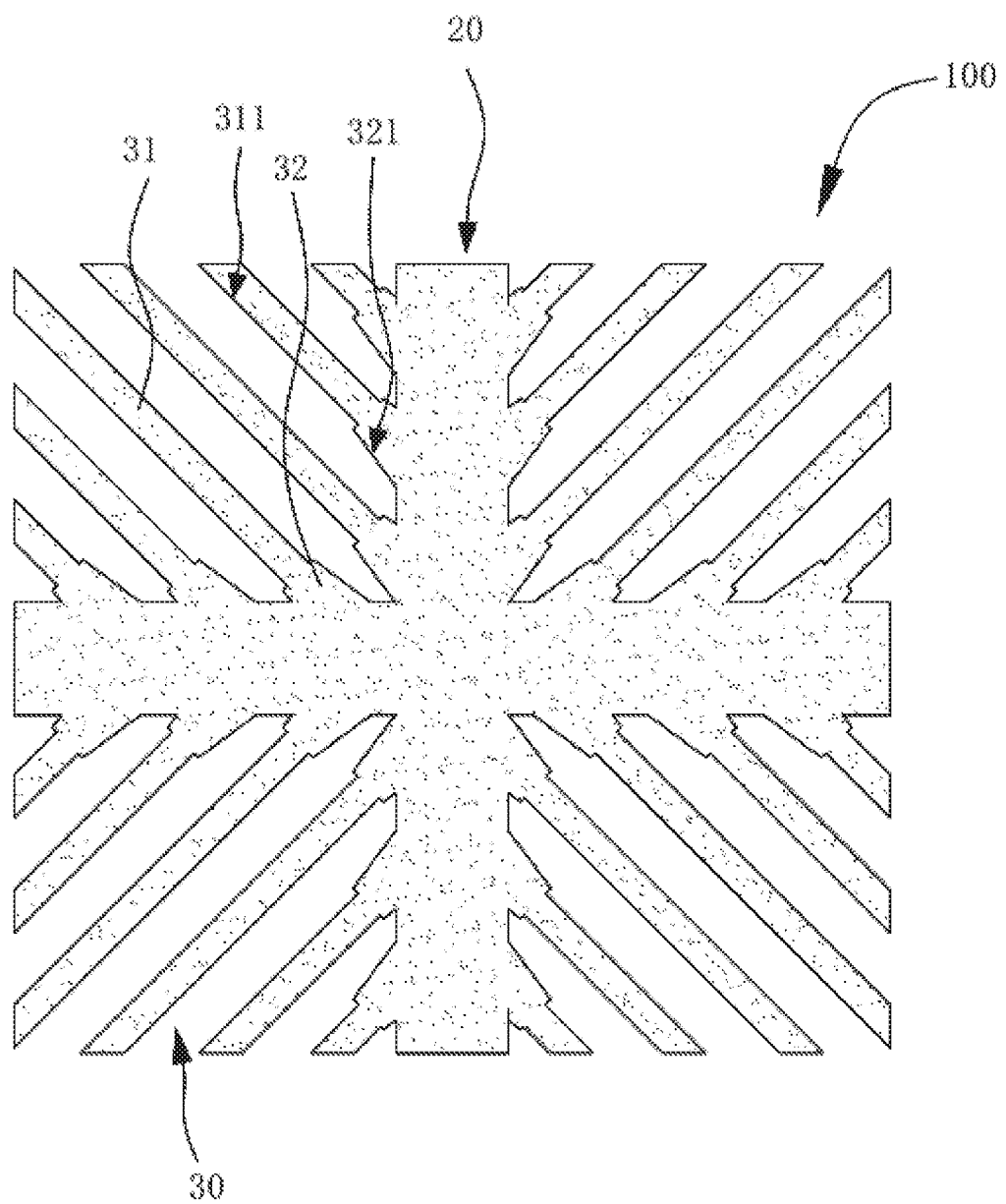
FIG. 3 and FIG. 4 are schematic diagrams of a pixel electrode of a first embodiment of the present disclosure.
Figure 4:
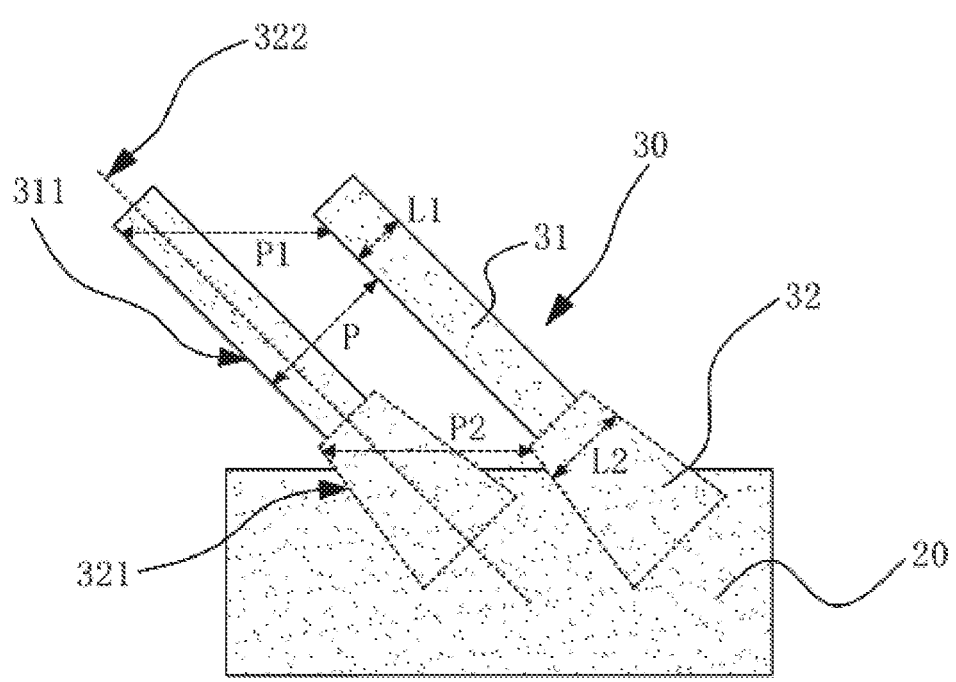

As shown in FIG. 3 and FIG. 4, the embodiment provides a pixel electrode 100 including a first pixel electrode 20 and a plurality of second pixel electrodes 30. The second pixel electrodes 30 are connected to the first pixel electrode 20.

The first pixel electrode 20 divides a sub-pixel area into a plurality of domains. In each domain, the second pixel electrodes 30 extend in different directions from the first pixel electrode 20. The second pixel electrodes 30 in adjacent domains extend in different directions.

The first pixel electrode 20 in this embodiment has a cross-shaped structure, and divides a sub-pixel area into four domains, and the second pixel electrodes 30 in each domain are spaced and arranged in parallel.

Each of the second pixel electrodes 30 includes a first sub-branch 31 and a second sub-branch 32. One end of the second sub-branch 32 is connected to the first sub-branch 31, and the other end of the second sub-branch 32 is connected to the first pixel electrode 20. One end of the first sub-branch 31 is connected to the second sub-branch 32, and the other end of the first sub-branch 31 is extended to the outside.

An extending direction of the first sub-branch 31 is at a certain angle with a horizontal direction. In the embodiment, angles between the extending direction of the first sub-branch 31 and the horizontal direction in the four domains are 45 degrees, 135 degrees, −135 degrees, and −45 degrees, respectively. This is because theoretically, when an azimuth angle of liquid crystal molecules is 45 degrees (a long axis is arranged along the extending direction of the sub-branch), a tilt angle is 90 degrees, and a pixel region has the highest transmittance.

As shown in FIG. 4, the first sub-branch 31 includes a first side 311, and the first side 311 is the same side as the extending direction of the first sub-branch (a left side or a right side of the first sub-branch). A horizontal connection distance between the first sides 311 of two adjacent first sub-branches 31 in a domain is P1.

The second sub-branch 32 includes a second side 321, and the second side 321 is the same side as the first sub-branch 31. A horizontal connection distance between the second sides 321 of two adjacent second sub-branches 32 in a domain is P2. P2 is equal to P1. A vertical distance between the first sides 311 of the adjacent two first sub-branches 31 in a domain is P, and the P value is between 6 and 4.5 micrometers. The P value in this embodiment is 5 micrometers.

The first sub-branch 31 is a strip pattern, the second sub-branch 32 is an axisymmetric pattern, and a symmetry axis 322 of the second sub-branch 32 is the same as the extending direction of the first sub-branch 31.

A first width L1 of the first sub-branch 31 is less than a second width L2 of the second sub-branch 32, and both the first width L1 and the second width L2 are measured in a direction perpendicular to the symmetry axis 322 of the second sub-branch 32.

Specifically, the second sub-branch 32 is an isosceles trapezoid, and the second sub-branch 32 in this embodiment is an obverse trapezoid, that is, a width of the second sub-branch 32 is gradually increased along a direction of the symmetry axis of the second sub-branch 32 toward the first pixel electrode 20.

The first sub-branch 31 in this embodiment may be a rectangle, and the first width L1 of the first sub-branch 31 is 2 micrometers. The vertical distance (vertical gap) between two adjacent first sub-branches 31 in a domain is 3 microns. According to theoretical analysis and experimental simulation test, when the vertical distance P of the same side of the first sub-branch remains unchanged, as the first width L1 of the first sub-branch decreases, the transmittance increases. However, an optimal design value of the first width L1 of the first sub-branch corresponding to each P value is different, and the optimum design value of L has a peak value (maximum value). Once L1 is smaller or larger than the peak value, the transmittance is lowered.

The second pixel electrode 30 in this embodiment includes one first sub-branch 31 and one second sub-branch 32. In other embodiments, at the junction (connection portion) of the first pixel electrode 20 and the second pixel electrode 30, a plurality of the second sub-branches 32 may be superimposed.

The first pixel electrode 20 in this embodiment is a trunk portion of the pixel electrode 100, and the second pixel electrode 30 is a branch portion of the pixel electrode 100. In comparison with the prior art, the disclosure increases the width of the branch portion at the boundary between the branch portion and the trunk portion, and increases an area of the pixel electrode by thickening the branch portion at the junction of the trunk portion, thereby enhancing the local electric field, so that it makes liquid crystal molecules easier to be inclined, increases a tilt angle factor, and reduces black stripes.

Second Embodiment

Figure 5:
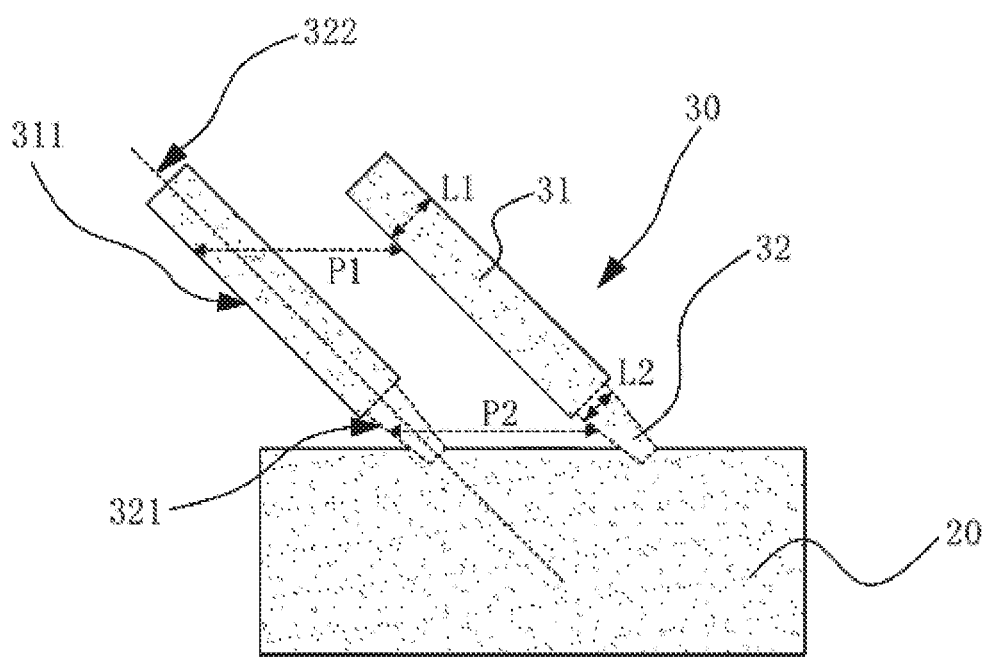
FIG. 5 is schematic diagram of a pixel electrode of a second embodiment of the present disclosure.

As shown in FIG. 5, the difference from the first embodiment is that the first width L1 of the first sub-branch 31 in the embodiment is greater than the second width L2 of the second sub-branch 32. The second sub-branch 32 is a reverse trapezoid, and a width of the second sub-branch is gradually decreased along the direction of the symmetry axis 322 toward the second sub-branch 32.

In other embodiments, the reverse trapezoid-shaped second sub-branch 32 may be disposed near the center of the cross of the first pixel electrode 20. Other junctions away from the center of the cross can be set to the obverse trapezoid-shaped second sub-branch as shown in FIG. 4. This is because a main reason for a low efficiency of the liquid crystal molecules located near the center of the cross of the first pixel electrode 20 is that the azimuth factor is less efficient, and the liquid crystal molecules are affected by three side electric fields, making it difficult to achieve a 45 degree azimuth deflection. By reducing the width of the second pixel electrodes 30 herein, the gap between the adjacent second pixel electrodes 30 is increased, the mutual influence of the three side electric fields is reduced, the azimuth factor is raised, and the transmittance is improved.

Third Embodiment

Figure 6:
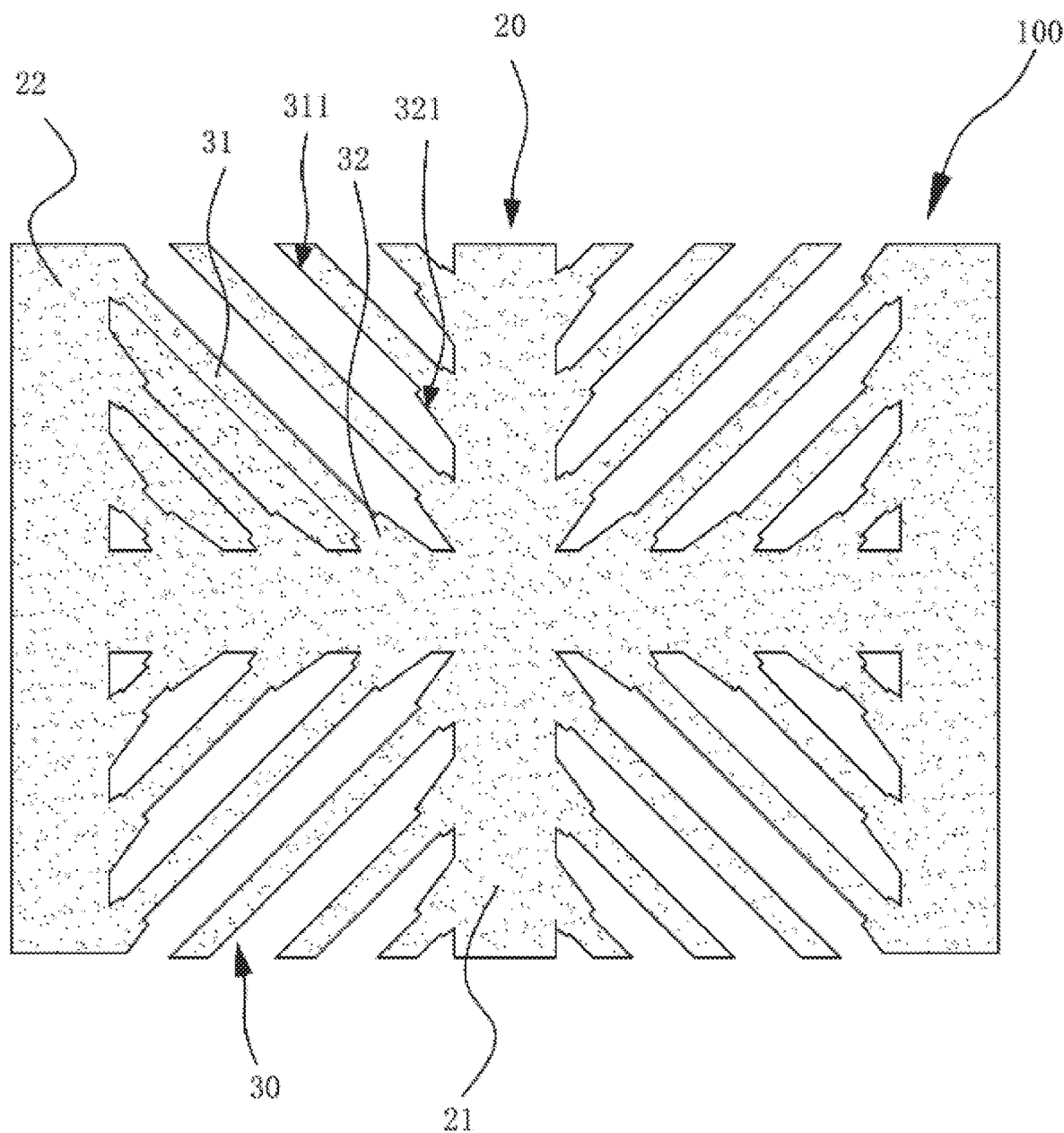
FIG. 6 and FIG. 7 are schematic diagrams of a pixel electrode of a third embodiment of the present disclosure.

As shown in FIG. 6, in comparison with the first embodiment, the first pixel electrode 20 in this embodiment includes a central trunk portion 21 and side trunk portions 22, and the central trunk portion 21 and the side trunk portions 22 together divide a sub-pixel area into four domains. The central trunk portion 21 is in the shape of a cross, and the side trunk portions 22 are respectively disposed on opposite sides of the central trunk portion 21 to surround the outer boundary of the second pixel electrodes 30 in the four domains.

Figure 7:
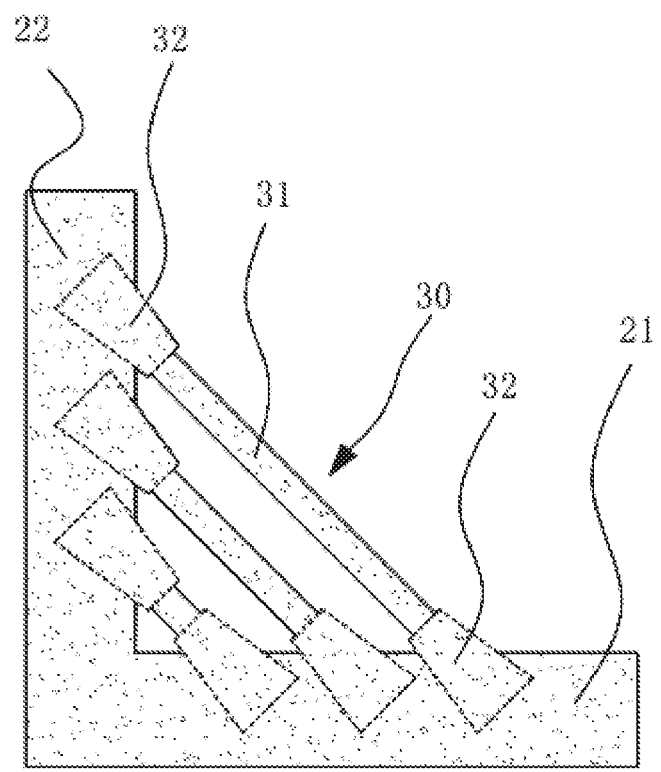

As shown in FIG. 7, which is a schematic diagram of a boundary between a second pixel electrode 30 and a first pixel electrode 20 in the embodiment. In a domain, a portion of two ends of the second pixel electrodes 30 are connected to the central trunk portion 21 and the side trunk portion 22, respectively. At a connection boundary with the central trunk portion 21 and the side trunk portion 22, a second sub-branch 32 is provided, that is, a portion of the second pixel electrodes 30 includes a first sub-branch 31 and two second sub-branch 32. Two opposite ends of the first sub-branch 31 are respectively connected to two second sub-branches 32. One end of the second sub-branch 32 is connected to the central trunk portion 21 (or side trunk portion 22), and the other end is connected to the first sub-branch 31. The structure of the second sub-branch 32 is the same as that of the second sub-branch in the first embodiment, and will not be described here again.

Due to the influence of the electric field of data lines and the common electrode at the boundary formed between the side trunk portion 22 and the second pixel electrodes 30, the liquid crystal efficiency at the boundary is lower than that at the boundary of the central trunk portion 21. Therefore, the second sub-branches 32 are also disposed at the boundary between the side trunk portion 22 and the second pixel electrodes 30 for improving black stripes and improving liquid crystal efficiency.

In other embodiments, the side trunk portions 22 are disposed on four sides of the cross central trunk portion 21, and surround the central trunk portion 21 and the second pixel electrodes 30. The side trunk portion 22 may also be disposed at three sides of the central trunk portion, and the specific structure may be determined according to actual design. However, it is to be ensured that at the boundary between the side trunk portion 22 and the second pixel electrode 30, the second sub-branch 32 is disposed at the boundary between the central trunk portion 21 and the second pixel electrode 30 to ensure the width of the second sub-branch 32 at the boundary is different from the width of the first sub-branch 31.

Fourth Embodiment

Figure 8:
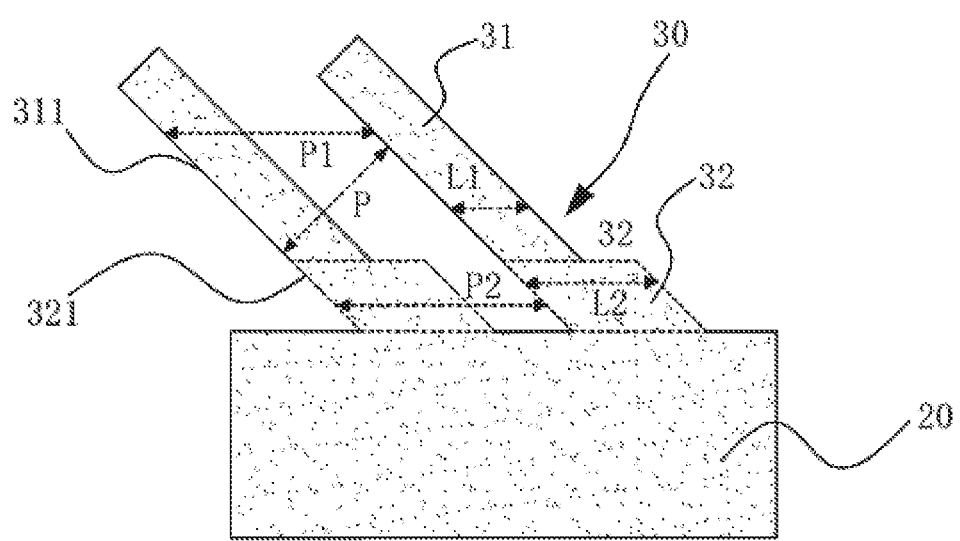
FIG. 8 is schematic diagram of a pixel electrode of a fourth embodiment of the present disclosure.

As shown in FIG. 8, the difference from the first embodiment is that the second sub-branch 32 in this embodiment is a center symmetrical pattern, specifically a parallelogram. In other embodiments, the second sub-branch 32 may be a diamond.

The first width L1 of the first sub-branch 31 is smaller than the second width L2 of the second sub-branch 32, and the first width L1 and the second width L2 are both measured in the same direction as the horizontal direction.

The first side 311 of the first sub-branch 31 is overlapped with the line where the second side 321 of the second sub-branch 32 is located.

Within a domain, the horizontal distance P1 between two first sides 311 of two adjacent first sub-branches 31 is equal to the horizontal distance P2 between two second side 321 of the adjacent two second sub-branches 32. By reducing the gap between the second pixel electrodes 30 at the boundary, the width of the second pixel electrodes 30 at the boundary can be increased, and the tilt angle factor of the liquid crystal at the boundary is increased, thereby increasing the transmittance.

Fifth Embodiment

Figure 9:
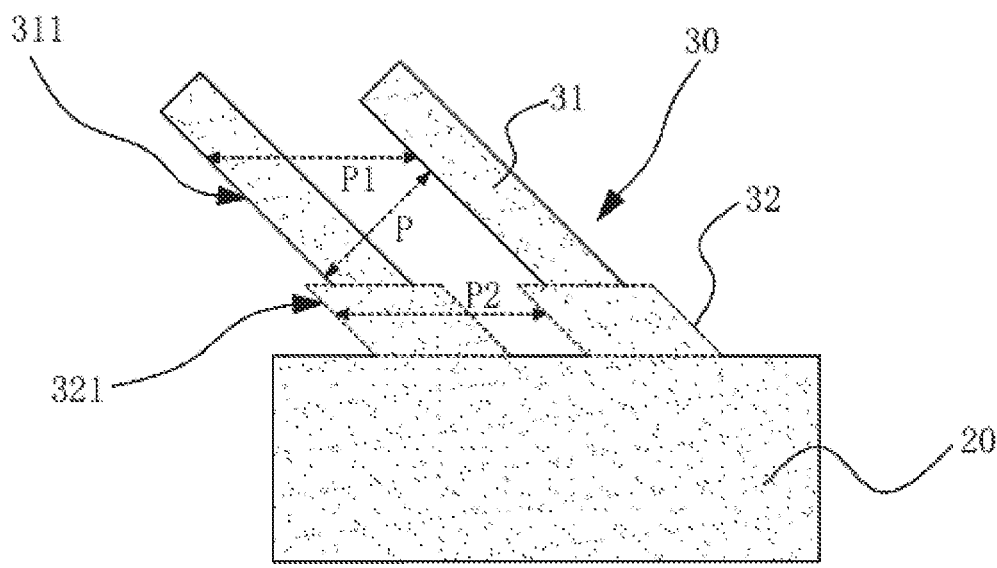
FIG. 9 is schematic diagram of a pixel electrode of a fifth embodiment of the present disclosure.

As shown in FIG. 9, the difference from the fourth embodiment is that the first side 311 of the first sub-branch 31 is not aligned with the second side 321 of the second sub-branch 32, and the first side 311 is parallel to the second side 321. Other structures are the same as those in the fourth embodiment.

Sixth Embodiment

Figure 10:
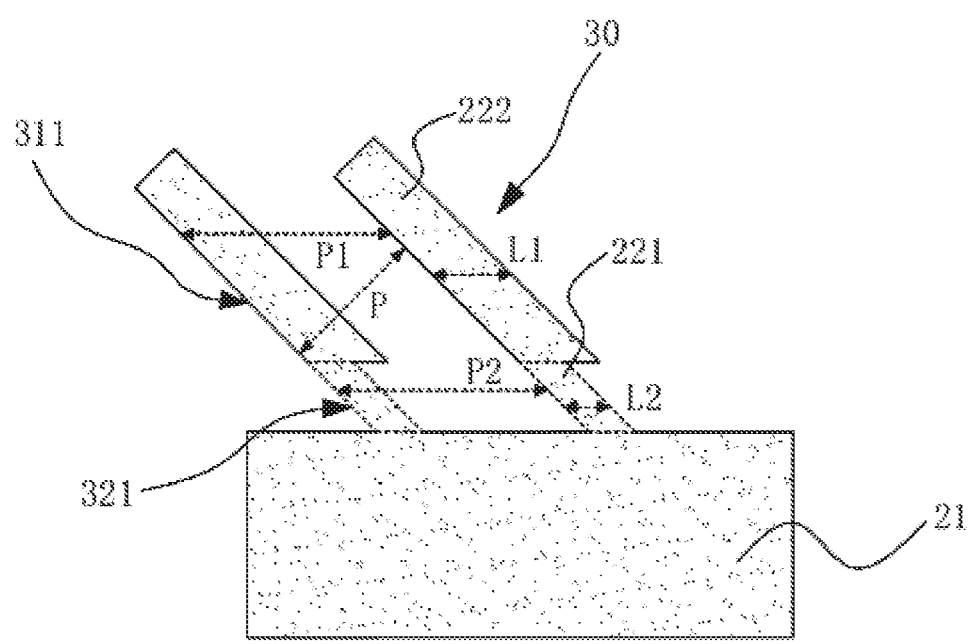
FIG. 10 is schematic diagram of a pixel electrode of a sixth embodiment of the present disclosure.

As shown in FIG. 10, the difference from the fourth embodiment is that the first width L1 of the first sub-branch 31 in this embodiment is greater than the second width L2 of the second sub-branch 32, and other structures are the same as those in the fourth embodiment.

Seventh Embodiment

Figure 11:
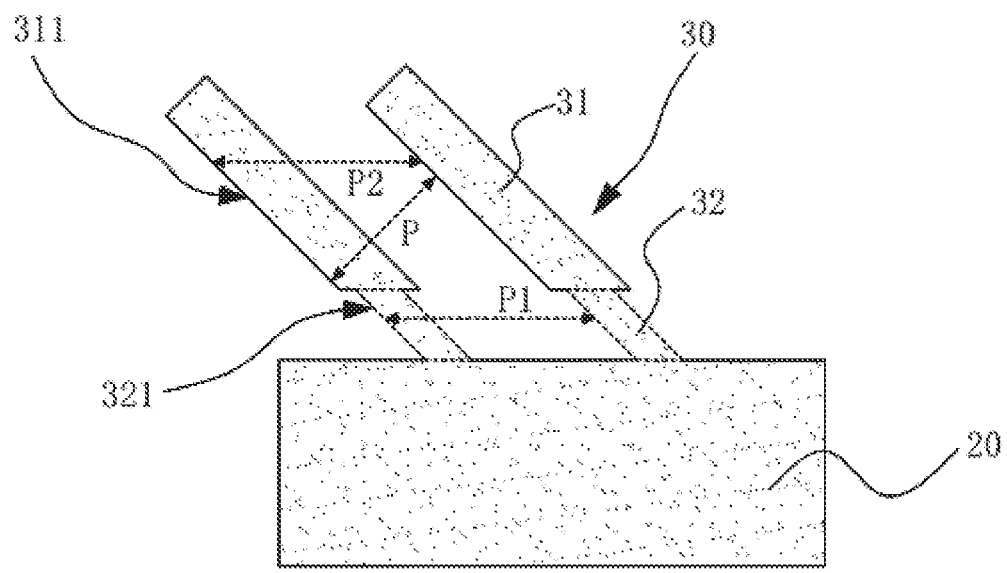
FIG. 11 is schematic diagram of a pixel electrode of a seventh embodiment of the present disclosure.

As shown in FIG. 11, the difference from the sixth embodiment is that the first side 311 of the first sub-branch 31 in this embodiment is not aligned with the second side 321 of the second sub-branch 32. Specifically, the first side 311 is parallel to the second side 321, and other structures are the same as those in the sixth embodiment.

The pixel electrode provided by the present disclosure can be applied to a display panel. Taking a liquid crystal display panel as an example, the liquid crystal display panel includes a thin film transistor (TFT) array substrate, a color filter substrate, a liquid crystal layer, a pixel electrode, and a common electrode.

The TFT array substrate is disposed opposite to the color filter substrate, and the pixel electrode is disposed on a side of the TFT array substrate facing the color filter substrate. The common electrode is disposed on a side of the color film substrate facing the TTF array substrate. The liquid crystal layer is disposed between the pixel electrode and the common electrode.

The advantages are as follows. The pixel electrode provided by the present disclosure can effectively control the black stripes by changing the width of the pixel electrode branch at the junction of the pixel electrode trunk portions, thereby improving the liquid crystal efficiency and the transmittance of the liquid crystal display panel.

The above are exemplary embodiments of the present disclosure. It should be noted that a number of improvements and modifications may be made by those of ordinary skill in the art without departing from the principles of the present disclosure, and should be considered as falling within the scope of the disclosure.

What is claimed is:

1. A pixel electrode, comprising:
a first pixel electrode having a cross-shaped structure; and
a plurality of second pixel electrodes, wherein each of the second pixel electrodes comprises:
a first sub-branch comprising a first side; and
at least one second sub-branch comprising a second side, wherein one end of the second sub-branch is directly connected to the first sub-branch, and another end is directly connected to the first pixel electrode;
wherein a first width of the first sub-branch is different from a second width of the second sub-branch, the first width of the first sub-branch is greater than the second width of the second sub-branch for the second sub-branch of one of the second pixel electrodes disposed near a center of a cross of the first pixel electrode, and the first width of the first sub-branch is less than the second width of the second sub-branch for the second sub-branch of one of the second pixel electrodes disposed away from the center of the cross of the first pixel electrode;
the second sub-branch comprises an axisymmetric pattern or a center symmetric pattern; and
the first pixel electrode divides a sub-pixel area into a plurality of domains, and the plurality of second pixel electrodes are spaced and arranged in parallel, and one of the second pixel electrodes is located in one of the domains;
wherein for the second sub-branch of the one of the second pixel electrodes disposed near the center of the cross of the first pixel electrode, the second sub-branch comprises an isosceles trapezoid, and a width of the second sub-branch is gradually decreased along a direction of a symmetry axis of the second sub-branch toward the first pixel electrode; and
wherein for the second sub-branch of the one of the second pixel electrodes disposed away from the center of the cross of the first pixel electrode, the second sub-branch comprises an isosceles trapezoid, and a width of the second sub-branch is gradually increased along a direction of a symmetry axis of the second sub-branch toward the first pixel electrode.

2. The pixel electrode as claimed in claim 1, wherein a vertical distance between two first sides of two adjacent first sub-branches in one domain ranges from 6 to 4.5 micrometers.

3. A pixel electrode, comprising:
a first pixel electrode having a cross-shaped structure; and
a plurality of second pixel electrodes, wherein each of the second pixel electrodes comprises:
a first sub-branch comprising a first side; and
at least one second sub-branch comprising a second side, wherein one end of the second sub-branch is directly connected to the first sub-branch, and another end is directly connected to the first pixel electrode;
wherein a first width of the first sub-branch is different from a second width of the second sub-branch, the first width of the first sub-branch is greater than the second width of the second sub-branch for the second sub-branch of one of the second pixel electrodes disposed near a center of a cross of the first pixel electrode, and the first width of the first sub-branch is less than the second width of the second sub-branch for the second sub-branch of one of the second pixel electrodes disposed away from the center of the cross of the first pixel electrode;

wherein for the second sub-branch of the one of the second pixel electrodes disposed near the center of the cross of the first pixel electrode, the second sub-branch comprises an isosceles trapezoid, and a width of the second sub-branch is gradually decreased along a direction of a symmetry axis of the second sub-branch toward the first pixel electrode; and wherein for the second sub-branch of the one of the second pixel electrodes disposed away from the center of the cross of the first pixel electrode, the second sub-branch comprises an isosceles trapezoid, and a width of the second sub-branch is gradually increased along a direction of a symmetry axis of the second sub-branch toward the first pixel electrode.

4. The pixel electrode as claimed in claim 3, wherein the second sub-branch comprises an axisymmetric pattern or a center symmetric pattern.

5. The pixel electrode as claimed in claim 3, wherein the first pixel electrode divides a sub-pixel area into a plurality of domains, and the plurality of second pixel electrodes are spaced and arranged in parallel, and one of the second pixel electrodes is located in one of the domains.

6. The pixel electrode as claimed in claim 5, wherein in one domain, a horizontal distance between two second sides of two adjacent second sub-branches is equal to another horizontal distance between two first sides of two adjacent first sub-branches.

7. The pixel electrode as claimed in claim 5, wherein a vertical distance between two first sides of two adjacent first sub-branches in one domain ranges from 6 to 4.5 micrometers.

8. The pixel electrode as claimed in claim 3, wherein the first pixel electrode includes a central trunk portion and side trunk portions, the central trunk portion is in a cross shape, and the side trunk portions are disposed on two opposite sides of the central trunk portion.

* * * * *